United States Patent
Castilla Moreno et al.

(10) Patent No.: US 11,850,648 B2
(45) Date of Patent: Dec. 26, 2023

(54) PRESS SYSTEMS AND METHODS

(71) Applicant: AUTOTECH ENGINEERING S.L., Amorebieta-Etxano (ES)

(72) Inventors: Jorge Castilla Moreno, Amorebieta-Etxano (ES); Igor Quintas Riaño, Amorebieta-Etxano (ES); Daniel Iglesias Morata, Amorebieta-Etxano (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 38 days.

(21) Appl. No.: 17/701,661

(22) Filed: Mar. 22, 2022

(65) Prior Publication Data
US 2022/0258223 A1    Aug. 18, 2022

Related U.S. Application Data

(63) Continuation of application No. PCT/EP2020/078835, filed on Oct. 14, 2020.

(30) Foreign Application Priority Data

Oct. 14, 2019  (EP) .................................... 19382899

(51) Int. Cl.
  *B21D 37/16*  (2006.01)
  *B21D 22/02*  (2006.01)

(52) U.S. Cl.
  CPC ........... *B21D 37/16* (2013.01); *B21D 22/022* (2013.01)

(58) Field of Classification Search
  CPC ...... B21D 37/16; B21D 22/02; B21D 22/206; B21D 22/022; B21D 22/208; B21D 22/286; C21D 9/573; C21D 11/005
  (Continued)

(56) References Cited

U.S. PATENT DOCUMENTS

2016/0059295 A1* 3/2016 Frost ..................... B21D 37/16
                                                    72/354.6
2016/0263640 A1* 9/2016 Martin Gonzalez ... C21D 1/673
  (Continued)

FOREIGN PATENT DOCUMENTS

DE    102011011013 A1   8/2012
EP       3067128 A1   9/2016
  (Continued)

OTHER PUBLICATIONS https://www.merriam-webster.com/dictionary/impinge (Year: 2022).*
International Search Report and Written Opinion dated Jan. 26, 2021 for PCT Application No. PCT/EP2020/078835, 12 pages.

*Primary Examiner* — Adam J Eiseman
*Assistant Examiner* — Fred C Hammers
(74) *Attorney, Agent, or Firm* — Squire Patton Boggs (US) LLP (57) ABSTRACT

Press apparatus and methods for manufacturing hot formed structural components are provided. The apparatus comprise a fixed lower body, and a mobile upper body. The apparatus comprise a cooling tool and a press tool which is arranged downstream from the cooling tool, and a blank transfer mechanism to transfer the blank from the cooling tool to the press tool. The cooling tool has an upper gas cooling tool connected to the mobile upper body and/or a lower gas cooling tool connected to the fixed lower body. The press tool comprises an upper pressing die connected to the upper body and a lower pressing die is connected to the lower body.

20 Claims, 7 Drawing Sheets

(58) Field of Classification Search
USPC .................................................... 72/54, 404
See application file for complete search history.

(56) References Cited

U.S. PATENT DOCUMENTS

| | | | |
|---|---|---|---|
| 2020/0038934 A1* | 2/2020 | Otsuka | B21D 22/26 |
| 2020/0199700 A1* | 6/2020 | Verma | C21D 1/673 |
| 2021/0032714 A1* | 2/2021 | Rana | C22C 38/02 |
| 2021/0362212 A1* | 11/2021 | Belanger | B21D 22/022 |

FOREIGN PATENT DOCUMENTS

| WO | WO 2012/085247 A2 | 6/2012 |
|---|---|---|
| WO | WO 2013/089167 A1 | 6/2013 |

* cited by examiner

PRESS SYSTEMS AND METHODS

CROSS-REFERENCE TO RELATED APPLICATIONS

The present application is a Continuation of International Patent Application No. PCT/EP2020/078835, filed Oct. 14, 2020, which claims the benefit of and priority to European patent application 19 382 899.3, filed on Oct. 14, 2019, both applications are incorporated by reference herein in their entirety for all purposes. The present disclosure relates to press systems for manufacturing hot formed structural components and methods therefor.

BACKGROUND

In the field of vehicle construction, the development and implementation of lightweight materials or components is becoming more and more important in order to satisfy criteria for lightweight construction. The demand for weight reduction is especially driven by the goal of reduction of $CO_2$ emissions. The growing concern for occupant safety also leads to the adoption of materials which improve the integrity of the vehicle during a crash while also improving the energy absorption.

A process known as Hot Forming Die Quenching (HFDQ) (also known as hot stamping or press hardening) uses boron steel sheets to create stamped components with Ultra High Strength Steel (UHSS) properties, with tensile strengths of e.g. 1500 MPa or even up to 2000 MPa or more. The increase in strength as compared to other materials allows for a thinner gauge material to be used, which results in weight savings over conventionally cold stamped mild steel components.

The steel sheets may be coated or uncoated. However, in order to improve corrosion protection before, during or after a hot stamping process, coatings may be applied. For example the use of Al—Si coatings or Zn coatings is known.

Depending on the composition of the base steel material, blanks may need to be quenched (i.e. be cooled down rapidly) to achieve the high tensile strengths. Quenching may mean a cooling rate above a critical cooling rate of the material used (e.g. approximately 30° C./s). Other steel materials may have relatively low critical cooling rates. Examples of steel material which can harden at room temperature by air cooling with relatively low cooling speed are known.

The hot stamping process may be performed in a manner such that a blank to be hot formed is heated to a predetermined temperature e.g. to or above an austenization temperature by, for example, a furnace system so as to decrease the strength i.e. to facilitate the hot stamping process. The blank to be hot formed may be formed by, a press system having a low temperature compared to the blank (e.g. room temperature) and a temperature control, thus a shaping process and a heat treatment using the temperature difference may be performed.

The use of multistep press systems for manufacturing hot formed elements is known. Multistep press systems may comprise a plurality of tools configured to perform different operations on blanks simultaneously. With such arrangements, a plurality of blanks undergo different manufacturing steps simultaneously at each stroke using the tools forming the multistep press system. An aspect of using such a multistep press system is that production output can be high.

A multistep press system may include a conveyor or a transferring device which transfers the heated blank to a press tool which is configured to press the blank. Further tools that may be included in a multistep press system may e.g. be any of a piercing tool, a calibration tool, a cutting tool, a trimming tool, a second press tool etc. Additionally, a furnace system that heats and softens the blank to be hot formed may be provided upstream from the multistep press system or apparatus.

Generally, in such systems, an external pre-cooling tool is used in order to previously cool down the blank to be hot formed. For example, zinc coated steel blanks generally may need to be cooled down before a hot forming process to reduce or minimize problems such as microcracks. Once the blank is cooled down, it is transferred from the external pre-cooling tool to the multistep press apparatus or system.

EP3067128 discloses press systems for manufacturing hot formed structural components. The systems comprise a fixed lower body, a mobile upper body and a mechanism configured to provide upwards and downwards press progression of the mobile upper body with respect to the fixed lower body. The system further comprises a cooling tool configured to cool down a previously heated blank which comprises: upper and lower mating dies, the lower die connected to the lower body with one or more lower biasing elements and/or the upper die connected to the upper body with one or more upper biasing elements. The system further comprises a press tool configured to draw the blank, wherein the press tool is arranged downstream from the cooling tool.

The system disclosed in EP3067128 is able to speed up the manufacturing process. In order to ensure that the cooling tool is able to cool down the blank sufficiently rapidly. The cooling tool is "closed" before the press tool is closed, due to the biasing elements that force the upper and lower cooling dies in contact with the blank, before the press tool is closed. Thus the dies of the cooling tool may be in contact enough time in order to properly cool down the blank. And with the integration of the tools in the same press, the transfer time from the cooling tool to the drawing tool may be reduced, thus the process may be optimized and the productivity may be improved while maintaining a satisfactory formability without causing a crack or the like at the blank.

However, the cooling tool with contact plates requires significant maintenance. Moreover, it is complicated to provide a homogeneous and constant cooling during production. In particular, when starting up production after an interruption, e.g. when starting with a new batch of products, or at the beginning of a working day, it takes a relatively long time (and corresponding loss of products) before the desirable cooling is achieved consistently.

The present disclosure seeks to provide improvements in multistep processes and systems.

SUMMARY

In a first aspect, a press apparatus for manufacturing hot formed structural components is provided. The press apparatus comprises a fixed lower body, a mobile upper body and a mechanism configured to provide upwards and downwards press progression of the mobile upper body with respect to the fixed lower body. The apparatus further comprises a cooling tool configured to cool down a previously heated blank and a press tool configured to draw the blank and which is arranged downstream from the cooling tool, and a blank transfer mechanism to transfer the blank from the cooling tool to the press tool.

Herein, the cooling tool has an upper gas cooling tool connected to the mobile upper body and/or a lower gas cooling tool connected to the fixed lower body. And the press tool comprises an upper pressing die connected to the upper body and a lower pressing die is connected to the lower body.

In accordance with this aspect, a multistep press apparatus is provided combining a cooling tool and a press tool. This can speed up the production process and allows for a high output. With the integration of the tools in the same press, the transfer time from the cooling tool to the drawing tool may be reduced, thus the process may be optimized and the productivity may be improved while maintaining a satisfactory formability without causing a crack or the like at the blank.

An aspect of using gas cooling is that it requires relatively little maintenance. It is also relatively easy with gas cooling to provide a constant homogeneous cooling process. I.e., gas cooling generally does not suffer from the disadvantages of using contact plates.

The provision of a gas cooling tool in the multistep apparatus also provides versatility. For example, for relatively thin blanks, only a lower gas cooling tool may be used. For the same process with blanks of increased thickness, an upper gas cooling tool may be added. Cycle time may then still be kept short. Depending on the needs, the cooling tools as disclosed herein allow flexibility in cooling parameters including cooling time, temperature of cooling gas, cooling flow etc.

In some examples, a single cooling tool is provided. For example, only a lower cooling tool connected to the fixed lower body can be provided. In this case, the press apparatus can have increased reliability and be relatively cost-effective. In other examples, only an upper cooling tool connected to the mobile upper body can be provided. In this case, the upper cooling tool may be connected to the mobile upper body using biasing elements which force the upper cooling tool towards the fixed lower body.

Due to the biasing elements, the upper and gas cooling tool may reach an appropriate position with respect to the blank to be cooled before the drawing/pressing with the press tool takes place. Within the same press apparatus, within one stroke, the cooling cycle may therefore be longer than the drawing cycle.

In yet further examples, an upper gas cooling tool is connected to the mobile upper body and a lower gas cooling tool is connected to the fixed lower body. In these cases, one or more upper biasing elements may connect the mobile upper body to the upper gas cooling tool. The upper biasing elements bias the upper gas cooling tool away from the mobile upper body. The lower gas cooling tool may be connected to the fixed lower body with one or more lower biasing elements that bias the lower gas cooling tool away from the fixed lower body.

In some examples, at a bottom of a press cycle the upper gas cooling tool is at a predetermined first distance with respect to the blank, and the lower gas cooling tool is at a predetermined second distance with respect to the blank. Effective and most predictable gas cooling can be achieved when the air is blown to the blank from a predetermined distance range with respect to the blank. At the bottom of the press cycle, a distance needs to be maintained between the cooling tool(s) and the blank.

The predetermined first distance may be equal to the predetermined second distance such that substantially equal cooling can be provided for both the upper and lower surface of the blank.

In some examples, the cooling tool may comprise stoppers that maintain a minimum distance between the upper gas cooling tool and the blank (or the lower gas cooling tool supporting the blank).

In some examples, the stoppers may be provided on the upper gas cooling tool and the stoppers are arranged to enter into contact with the lower gas cooling tool (or the lower fixed body) to create a force opposite to the biasing elements. Such a force opposite to the biasing elements ensures that the distance is maintained as the press stroke continues. As the mobile upper body continues to move towards the lower fixed body, the biasing elements may be compressed and the distance between the gas cooling tools and the blank can be maintained.

In some examples, the stoppers may be rods or bars.

In some examples, the apparatus may be configured to start a cooling cycle when the minimum distance between the upper gas cooling tool and lower gas cooling tool is reached. Homogeneous cooling on both sides can be achieved if the air flow from both sides is substantially equal and coming from the same distance. Increased cooling for e.g. relatively thick blanks can be achieved with upper and lower cooling tools. Cooling cycles in these examples may be intermittent. Such intermittent cooling cycles may also be used in examples wherein only a lower gas cooling tool or only an upper gas cooling tool is provided. As soon as a blank is positioned, a cooling cycle may be started.

In other examples, cooling may be substantially continuous. I.e. the flow of cooling gas may be constant and thus cooling can start as soon as a blank is transferred to the cooling tool. This might be implemented both when a single gas cooling tool is used and when two gas cooling tools are used.

In some examples, the biasing elements may comprise one or more springs. In further examples, the biasing elements may comprise hydraulic or pneumatic actuators.

In some examples, the upper gas cooling tool and/or the lower gas cooling tool comprise a plurality of slots connected to a pressurized gas reservoir, and the system further comprising a control for controlling the gas passage from the reservoir through the slots. The cooling rate and temperature to be reached may be controlled through the gas volumetric flow, the gas temperature and the distance from the slots to the blank. In some examples, the system may further include a temperature control of the pressurized gas in the reservoir.

In some examples, the slots may be directed substantially perpendicularly to the blank.

In some examples, the gas may be air and may be substantially at ambient temperature. A cost efficient system may be provided in this aspect.

In some examples, the upper and/or lower pressing die of the press tool comprises channels conducting cooling liquid or cooling air. In some examples, the material of the blank and the required microstructure of the resulting component are such that a high cooling rate is necessary or desirable. The press tool may be temperature controlled to provide an appropriately high, or appropriately low cooling rate. The cooling rate might also be different for one part of the blank than for another part of the same blank. The resulting microstructure for these different portions may thus be different.

In some examples, a temperature at the upper and/or lower pressing die is controlled based on a temperature at a working surface of one of the dies. The press apparatus may comprise one or more thermocouples at the working surface of one of the pressing dies.

In some examples, the press apparatus may be a mechanical press. In other examples, the press apparatus may be a servo mechanical press. In yet further examples, the press apparatus may be a hydraulic press. The herein disclosed methods and systems may be implemented in press apparatus of different kings. Mechanical and servo mechanical press apparatus can provide high output, whereas the biasing elements in the apparatus allow for some flexibility in the adjust of the cooling cycle.

In some examples, the press apparatus may further comprise a first post-operation tool configured to perform a first post-operation, wherein the first post-operation tool is arranged downstream of the press tool and comprises: upper and lower first post-operation tool dies, wherein the upper first post-operation tool die is connected to the upper body and the lower first post-operation tool die is connected to the lower body. Herein, the blank transfer mechanism is further configured to transfer the blank from the press tool to the first post-operation tool.

Multiple stages and processes may be added to the same press apparatus. The operations performed after drawing of the blank are herein referred to as "post-operations".

In some examples, the first post-operation comprises trimming and/or cutting the blank, and the upper and/or the lower first post-operation tool dies may comprise one or more cutting blades.

In order to control the temperature during the process, the upper and/or the lower first post-operation tool die may comprises one or more heaters or channels conducting a hot liquid. In order to maintain some deformability and in order to facilitate cutting, trimming or other machining operations, it may be beneficial that the blank maintains a minimum temperature. Wear of the post-operation tools may thus be reduced.

To this effect, in some examples, the heaters or channels conducting a hot liquid may be configured to maintain the temperature of the blank above 200° C. based on the temperature measured at the dies of the first post-operation tool.

In some examples, the upper and/or the lower first post-operation tool die may comprises channels conducting cooling liquid, optionally cooling water. In some examples, a temperature at the upper and/or lower first post-operation tool die may be controlled based on a temperature at a working surface of one of the dies. Optionally, thermocouples at the working surface of one of the first post-operation tool dies may be provided.

In some examples, the press apparatus may further comprise a second post-operation tool, the second post-operation tool being arranged downstream of the first post-operation tool. The blank transfer mechanism may further be configured to transfer the blank from the first post-operation tool to the second post-operation tool and the upper second post-operation tool die is connected to the upper body and the lower second post-operation tool die is connected to the lower body.

In some examples, the second post-operation tool is configured for trimming and/or piercing.

In some examples, the second post-operation tool may be configured for calibration. In these cases, the second post-operation tool may comprise an adjusting device configured to adjust a distance between the upper and lower second post-operation tool dies so as to deform the blank, and wherein the adjusting device is controlled based on a sensor system configured to detect the thickness of the blank.

Temperature control in the second post-operation tool may be the same or similar as the temperature control in the first post-operation tool.

In a further aspect, a method for hot forming a blank is provided. The method comprises providing a press apparatus according to any of the examples herein described, and providing a blank to be hot formed made of an Ultra High Strength Steel (UHSS) having a Zinc coating. The method may comprise heating the blank; placing the blank in the cooling tool; and cooling down the blank while providing a downwards press progression of the mobile upper body with respect the fixed lower body. Then, the method further comprises performing an upwards press progression of the mobile upper body with respect to the fixed lower body; positioning the blank in the press tool; and drawing the blank by performing a downward and upwards press progression of the mobile upper body with respect to the fixed lower body.

In some examples, the blank may be heated to above an austenization temperature of the UHSS. The blank may be heated to above Ac1, and in some examples, the blank may be heated to above Ac3.

In some examples, the blank may be heated to a temperature between 860° C. and 910° C.

In some examples, the UHSS may comprise by weight: 0.20-0.50% C, 0.75-1.5% Si and 1.50-2.50% Mn. Preferably, the UHSS comprises in weight percentages 0.21-0.25% C, 1.05-1.33% Si, 2.06-2.34% Mn. More preferably, the UHSS may comprise approximately by weight 0.22% C, 1.2% Si, 2.2% Mn. An UHSS of such a composition that may be able to air harden. Optionally, the UHSS further comprises Mn, Al, Ti, B, P, S, N.

The UHSS may be provided with a protective coating in order to improve corrosion protection before, during or after a hot stamping process. This coating may be a Zinc coating or an Aluminum-Silicon coating.

In some examples, the blank may be cooled down in the cooling tool to a temperature between 400 and 600° C. For UHSS with a Zinc coating, cooling down to this temperature range before drawing, may avoid forming cracks. The temperature range is such that good formability is still maintained for the subsequent drawing process.

UHSS blanks with an aluminium silicon coating might be used so that shot blasting to remove the zinc oxide layer partially or completely after a hot stamping process is not necessary. The use of a multistep apparatus can improve throughput.

In some examples, the method may further comprise cooling down the blank during drawing. In some examples, the blank may be cooled down during drawing to a temperature between 320° C. and 280° C.

In some examples, the temperature of the blank may be maintained above 200° C. in a first and optionally also in a second post-operation tool.

In some examples, the blanks may be made from an UHSS comprising in weight percentages 0.15-0.25% C, maximum 0.5% Si, maximum 2.5% Mn, 0.002-0.005% B and maximum 0.05% Cr. In some examples, the UHSS may further comprise Al, Ti, P, and Mo.

In some examples, the blanks may be made from an UHSS comprising in weight percentages 0.15-0.25% C, maximum 1% Si, maximum 2.5% Mn, 0.002-0.005% B and 0.5-0.7% Cr. Preferably the UHSS material comprises in weight percentages 0.15-0.25% C, maximum 0.5% Si, maximum 2.5% Mn, 0.002-0.005% B and maximum 0.5% Cr. In some examples, the UHSS may further comprise Al, Ti, P, and Mo.

In an alternative example, the UHSS material comprises in weight percentages 0.15-0.25% C, maximum 0.5% Si, maximum 2.5% Mn, 0.002-0.005% B and maximum 0.5% Cr, preferably about 0.3% Cr. In some examples, the UHSS may further comprise Al, Ti, P, and Mo.

UHSS with the compositions according to the preceding paragraphs are not configured for air hardening and may instead require a higher cooling rate in order to obtain a martensitic microstructure.

In some examples, the steel that does not harden by ambient air may be a 22MnB5 steel. Usibor® 1500P is an example of a 22MnB5 steel. The composition of Usibor® is summarized below in weight percentages (rest is iron (Fe) and unavoidable impurities):

| C | Si | Mn | P | S | Cr | Ti | B | N |
|---|----|----|---|---|----|----|---|---|
| 0.24 | 0.27 | 1.14 | 0.015 | 0.001 | 0.17 | 0.036 | 0.003 | 0.004 |

After a hot stamping die quenching process, Usibor® 1500P may have a yield strength of e.g. 1.100 MPa, and an ultimate tensile strength of 1.500 MPa.

Usibor® 2000 is another boron steel with even higher strength. After a hot stamping die quenching process, the yield strength of Usibor® 2000 may be 1.400 MPa or more, and the ultimate tensile strength may be above 1.800 MPa. A composition of Usibor® 2000 includes a maximum of 0.37% of carbon, a maximum of manganese of 1.4%, a maximum of 0.7% of silicon and a maximum of 0.005% of boron by weight.

For non-air hardenable UHSS, a first cooling of the blank prior to drawing the blank may occur from above an austenization temperature to a temperature between 600° C.-800° C., optionally between 650° C.-700° C. Subsequently, during forming the temperature of the blank may be reduced to e.g. 450° C.-250° C., optionally between 320° C.-280° C.

BRIEF DESCRIPTION OF THE DRAWINGS

Non-limiting examples of the present disclosure will be described in the following, with reference to the appended drawings, in which:

FIG. 2b schematically illustrates an upper gas cooling tool according to the example of FIG. 2a;

DETAILED DESCRIPTION OF EXAMPLES

Figure 1:
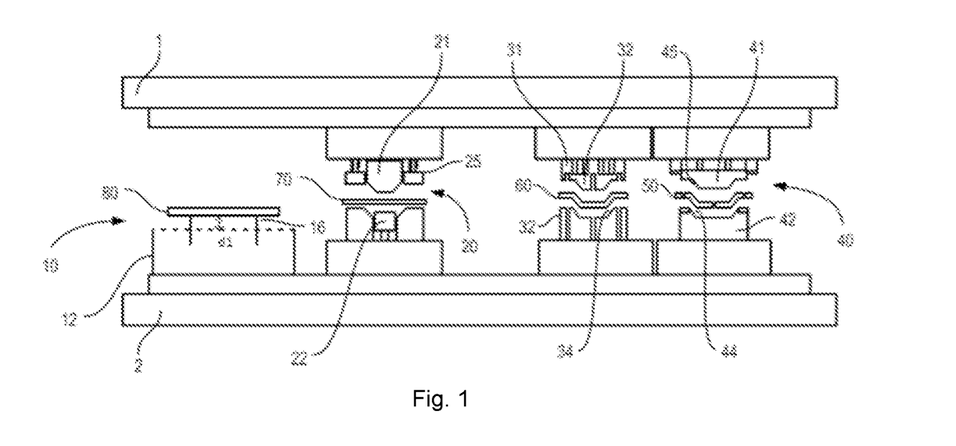
FIG. 1 schematically represents a multistep press system according to an example.
Figure 1A:
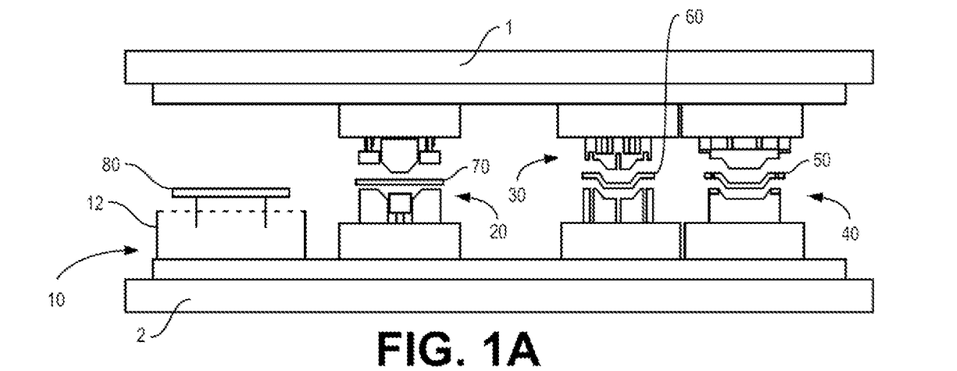
FIGS. 1A-1F schematically illustrate sequence of steps during a method for cooling and forming a blank using a multistep press system according to FIG. 1.

FIG. 1A schematically represents an example of a multistep press apparatus. The apparatus 1 comprises a fixed lower body 2, a mobile upper body 3 and a mechanism (not shown) configured to provide upwards and downwards press progression of the mobile upper body 3 with respect to the fixed lower body 2.

The fixed lower body 2 may be a large block of metal. In this particular example, the fixed lower body 2 may be stationary. In some examples, a die cushion (not shown) integrated in fixed lower body 2 may be provided. The cushion may be configured to receive and control blank holder forces. The mobile upper body 3 may also be a solid piece of metal. The mobile upper body 3 may provide the stroke cycle (up and down movement).

The press system may be configured to perform approximately 30 strokes per minute, thus each stroke cycle may be of approximately 2 seconds. The stroke cycle could be different in further examples.

The mechanism of the press may be driven mechanically, hydraulically or servo mechanically. The progression of the mobile upper body 3 with respect to the fixed lower body 2 may be determined by the mechanism. In this particular example, the press may be a servo mechanical press, thus a constant press force during the stroke may be provided. The servo mechanical press may be provided with infinite slide (ram) speed and position control. The servo mechanical press may also be provided with a good range of availability of press forces at any slide position, thus a great flexibility of the press may be achieved. Servo drive presses may have capabilities to improve process conditions and productivity in metal forming. The press may have a press force of e.g. 2000 Tn.

In some examples, the press may be a mechanical press, thus the press force progression towards the fixed lower body 2 may depend on the drive and hinge system. Mechanical presses therefore can reach higher cycles per unit of time. Alternatively, hydraulic presses may also be used.

A cooling tool 10 configured to cool down a previously heated blank 80 is shown in FIG. 1. The cooling tool 10 may comprise a lower gas cooling tool 12. This lower cooling tool may comprise air knives. The lower cooling tool 12 may comprise a pressurized air plenum containing a series of holes or continuous slots through which pressurized air exits, and preferably in a laminar flow pattern.

The air that exits from the slots or holes impinges upon heated blank 80. The blank 80 therefore cools down.

The lower gas cooling tool may include various controls mechanisms. For example, the temperature of the gas in the pressurized plenum may be controlled. Alternatively or additionally, one or more valves may be included to control the air flow towards the blank.

An advantage of using gas cooling is that the cooling profile (temperature vs time) can be accurately controlled. Also, it is relatively easy to maintain homogenous cooling throughout a production cycle of e.g. a day.

In examples, the cooling tool may be provided with centering elements e.g. pins, blank holders 16 and/or guiding devices.

Pins or holders 16 maintain the blank 80 at a distance dl from lower gas cooling tool at all times.

A press tool 20 configured to form or draw the blank is also provided in this example and integrated in the multistep press apparatus. The press tool 20 is arranged downstream from the cooling tool 10. The press tool 20 comprises upper 21 and lower mating dies. Mating herein means that the dies have complementary shapes such that the blank placed in between them is deformed when the upper press die 21 is moved towards the lower press die 22.

In this particular case, blank 70 is shown to undergo a forming or drawing step in the next press cycle. It should be clear that blank 70 in the previous cycle has undergone a cooling process in the cooling tool 10.

The upper die 21 may comprise an upper working surface 23 that in use faces the blank to be hot formed. The lower die 22 may comprise a lower working surface 24 that in use faces the blank to be hot formed. A side or portion of the upper die opposite to the upper working surface 23 may be connected to the upper body 3 and a side or portion of the lower die opposite to the lower working surface 22 may be connected to the lower body 2.

The upper 21 and lower 22 mating dies may comprise channels with cold fluid e.g. water and/or cold air passing through the channels provided in the dies. In the water channels, the speed circulation of the water at the channels may be high, so that water evaporation may be avoided. A control system may further be provided, to control the temperature of the dies.

In examples, the press system 20 may be provided with a blank holder (25 configured to hold a blank and to position the blank onto the lower die 22. The blank holder may be provided with a one or more biasing elements configured to bias the blank holder to a position at a predetermined distance from the lower die 22.

A first post-operation tool 30 configured to perform trimming and/or piercing operations may be provided. In this particular example, blank 60 is to undergo a trimming or cutting operation in the next stroke of the press apparatus. It should be clear that blank 60 has previously undergone a cooling process in cooling tool 10 and a forming process in press tool 20.

The first post-operation tool 30 is arranged downstream of the press tool 20. The first post operation tool 30 may comprise upper 32 and lower 31 dies. The upper die 32 may comprise an upper working surface 33 and the lower mating die 31 may comprise a lower working surface 34. Both working surfaces in use face the blank 60.

A side of the upper die 32 opposite to the upper working surface 33 may be fastened to the upper body 3 and a side of the lower die 31 opposite to the lower working surface may be fastened to the lower body 2. The dies may comprise one or more knives or cutting blades (not shown) arranged on the working surfaces.

The first post operation tool 30 may comprise one or more electrical heaters or channels conducting hot liquid and temperature sensors to control the temperature of the dies. The sensors may be thermocouples. In some examples, it is preferable to maintain the temperature of the blank located between the upper and lower dies when in use at or near a predetermined temperature e.g. above 200° C., above 250° C. or above 300° C.

In some examples, the upper 32 and lower 31 mating dies may comprise channels with cold fluid e.g. water and/or cold air passing through the channels provided in the dies.

In examples, the first post operation tool 30 may be provided with a blank holder (not shown) configured to hold a blank and to positioning the blank onto the lower die 31. The blank holder may also be provided with one or more biasing elements configured to bias the blank holder to a position at a predetermined distance from the lower die.

In the example of FIG. 1, a second post-operation tool 40 is provided. The second post-operation tool 40 may also be configured to perform further trimming and/or piercing operations. The second post-operation tool 40 is arranged downstream from the first post operation tool 30. The second post-operation tool 40 may comprise an upper die 42 and a lower die 41. The upper mating die 42 may comprise an upper working surface 43 and the lower mating die 41 may comprise a lower working surface 44. Both working surfaces in use may face the blank to be hot formed. The working surfaces may be uneven, e.g. they may comprise protruding portions or recesses.

A side of the upper die 42 opposite to the working surface 43 may be connected to the upper body 3. A side of the lower die 41 opposite to the working surface 44 is connected to the lower body 2.

The dies may comprise one or more knives or cutting blades arranged on the working surfaces.

In some examples, an adjusting device (not shown) configured to adjust the distance between the upper 42 and lower 41 dies may be provided. This way, the blank 50 located between the upper 42 and lower 41 dies when in use may be deformed along the working surfaces of each upper and lower die.

Once the adjustment of the distance between the upper 42 and lower dies 41 in order to deform (and thus calibrate the blank) is performed, the tolerances of the hot formed blank may be improved. In some examples, the blank to be hot formed may have an area with a non-optimized thickness e.g. greater thickness in one part of the blank than in some other part, thus the thickness has to be optimized.

With this arrangement of uneven working surfaces, the distance at selected portions of the working surfaces (e.g. near a radius in the blank) may be adjusted at or near the area with a non-optimized thickness, thus the material may be deformed i.e. forced to flow to zones adjacent to the area with a non-optimized thickness, thus a constant thickness along the blank may be achieved.

In examples, the adjusting device may be controlled based on a sensor system configured to detect the thickness of the blank.

In some examples, the second post-operation tool 40 may be provided with a blank holder (not shown) configured to hold a blank and to positioning the blank onto the lower die 41. The blank holder may also be provided with a one or more biasing elements configured to bias the blank holder to a position at a predetermined distance from the lower die.

In further examples, other ways of adapting the dies of the tools to operate at lower or higher temperatures may also be foreseen.

It should be understood that although the figure describes dies having a substantially square or rectangular shape, the blocks may have any other shape and may even have partially rounded shapes.

An automatic transfer device (not shown) e.g. a plurality of industrial robots or a conveyor may also be provided to perform the transfer of blanks between the tools.

In all examples, temperature sensors and control systems in order to control the temperature may be provided in any tools or in the transfer system. The tools may also be provided with further cooling systems, blanks holders, etc. . . . .

FIGS. 1A-1F schematically illustrate a sequence of situations occurring during the performance of a method for cooling down and forming a blank according to an example. The same reference numbers denote the same elements.

For the sake of simplicity, references to angles of the press cycle have occasionally been included in descriptions relating to FIG. 1a (and further figures). The references to angles may be used to indicate approximate positions of the upper body with respect to the lower body. Thus, for example, reference may be made to the upper body 1 being at 0° position with respect to the lower body which indicates that the upper body is in the highest position with respect to the lower body and a position of 180° indicates that the upper body is in the lowest position (full contact position) with respect to the lower body. 360° then refers again to the upper body being in the highest position and the process cycle having been completed.

In FIG. 1A, a blank 80 to be hot formed made of an Ultra High Strength Steel (UHSS) may be provided. In this specific example, the blank 80 may have a Zinc coating. In some examples, the UHSS may contain e.g. approximately 0.22% C, 1.2% Si, 2.2%. The specified amounts of Si and Mn may enable hardening of the blank at a room temperature, and thus quenching may be avoided (and thus the blank manufacturing press time may be reduced). The blank material may further comprise Mn, Al, Ti, B, P, S, N in different proportions.

An Ultra High Strength Steel (UHSS) of such characteristics may have an Ac3 transformation point (austenite transformation point, hereinafter, referred to as "Ac3 point") between 860 and 870° C. For the above mentioned steel composition Ac3 may be approximately 867° C. The Ms transformation point (martensite start temperature, hereinafter, referred to as "Ms point") may be between 380 and 390° C. For the above mentioned steel composition, Ms may be approximately 386° C. The Mf transformation point (martensite finish temperature, hereinafter, referred to as "Mf point") may be at or near 270° C.

Different steel compositions may be used. Particularly the steel compositions described in EP 2 735 620 A1 may be considered suitable. Specific reference may be had to table 1 and paragraphs 0016-0021 of EP 2 735 620, and to the considerations of paragraphs 0067-0079.

The blank 80 may be heated in order to reach at least the austenization temperature. The heating may be performed in a heating device (which is not shown) e.g. a furnace. In this particular example, the maximum temperature to heat the blank may be determined by the coating. The melting point (and thus the evaporation temperature) of the Zinc may be at or near 910° C., thus the maximum temperature to heat the blank in the heating device may be set below approximately 910° C. The blank 80 may be heated to a temperature higher than Ac3 but lower than the evaporation temperature of the Zinc at or near 910° C. Thus, the heating may be performed between 867° C. and 910° C., specifically at or near 890° C. (for the above mentioned steel composition). The period of time to be heated may be approximately 6 minutes, but it is dependent on e.g. the blank's thickness.

Once the blank 80 has been heated to the desired temperature for sufficiently long, blank 80 may be transferred to the cooling tool 10. This may be done by an automatic transfer device (not shown) e.g. a plurality of industrial robots or a conveyor. The transfer time of the blank between the furnace (not shown) and the cooling tool 10 may be between 2 and 3 seconds.

In some examples, a centering element e.g. pins and/or guiding devices may be provided upstream from the cooling tool, thus the blank may be properly centered. The blank 80 may be positioned on pins or blank holders 16 that maintain a small distance between lower gas cooling tool 12 and blank 80.

The press upper body 3 may be located at an open position (0° position). The blank 80 is then positioned on the gas cooling tool 11. In some examples, the blank may be placed on a blank holder.

As commented above, the biasing elements may comprise, for example, a spring e.g. a mechanical spring or a gas spring although some other biasing elements may be possible e.g. hydraulic mechanism. The hydraulic mechanism may be a passive or an active mechanism.

Figure 1B:
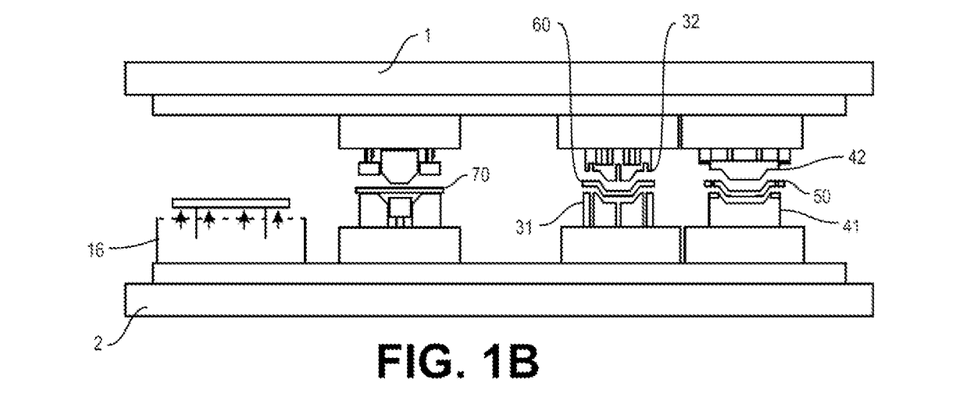

In FIG. 1b, the press has started a downwards press progression of the mobile upper body 1 with respect to the fixed lower body 2. In this specific example, cooling has already started. It is noted however that in other examples, cooling cycles may be continuous and thus cooling may start as soon as blank 80 is positioned in the cooling tool.

A pressurized cooling gas flow (which may be air) may impinge on the blank. The gas flow may be controlled based on measurements of a flow meter. The pressure of the gas may be e.g. around 2 bar. The required gas flow, gas temperature and cooling time may vary e.g. as a function of the thickness of the blank. A thicker blank will take longer to cool down unless gas temperature is lowered and/or gas flow is increased.

The slots or holes through which gas may flow towards the blank may be arranged substantially perpendicular to the faces of the blanks.

Figure 1C:
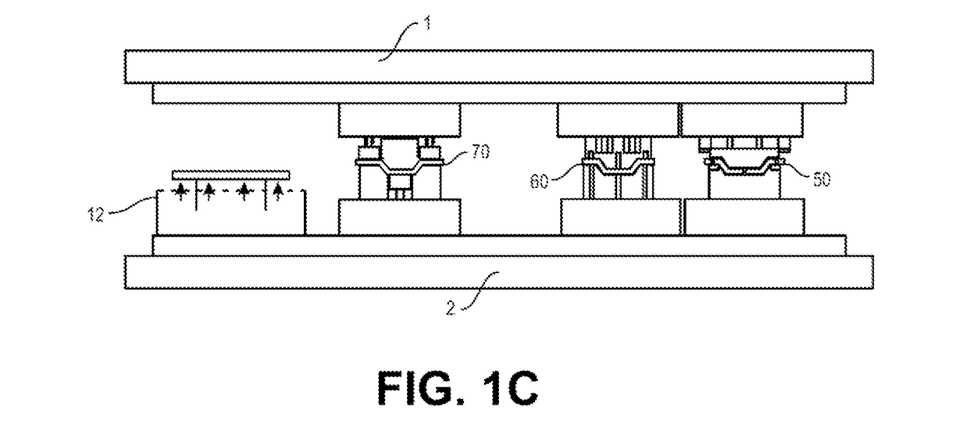

In FIG. 1c, e.g. in a range between 130-180°, deformation may start in the press tool.

Figure 1D:
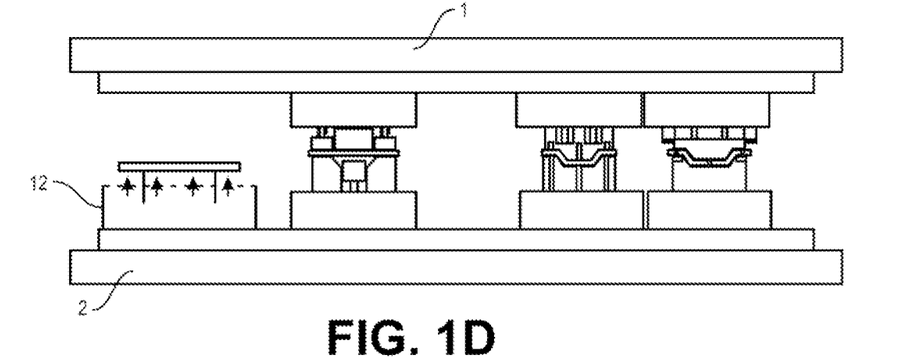

In FIG. 1d, after the final desired position (180° position) is reached, an upwards press progression of the upper body by the press mechanism may be provided. The end of the cooling cycle may be between 210° and 270° position of the upper body (and thus the upper die) with respect to the lower body.

As previously commented, while the blank 80 is pressed, the blank may be cooled down by using cooling equipment in the press dies. It has been found that the Ultra High Strength Steel (UHSS) having a Zinc coating may show microcracks for temperatures higher than 600° C. at a press tool. This way, the blank may be cooled down before being transported to the press tool to temperatures below 600° C., specifically between 500° C. and 600° C. and preferably at or near 550° C.

It has already been commented that the blank 80 may be previously heated at or near 890° C. i.e. heated at a furnace. The blank may be transferred to the cooling tool 10, thus the during the transfer period the temperature may be reduced to between 850° C. and 800° C. or 750° C. The blank may then be cooled down to a temperature around 550° C.

With the cooling tool 10 integrated in the press system apparatus, the time in order to cool down the blank may be optimized since an extra movement in order to transfer the blank from an external cooling tool may be avoided. It also may be time saving.

Furthermore, the movements of the blank between the tools may be limited, thus the cooling rates are easily controlled.

Figure 1E:
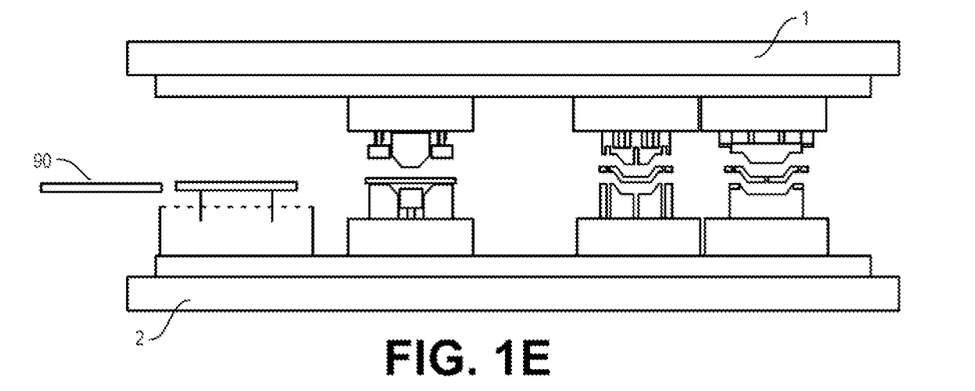

In FIG. 1E, the blank 80 may already have cooled down, and thus may be ready to be transferred from the cooling tool 10 to the press tool 20. The transferring may be performed by an automatic transfer device (not shown) e.g. a plurality of industrial robots or a conveyor. As commented above, the blank may transferred at a temperature at or near 550° C. Due to the transfer time, the blank 80 may be cooled down before it reaches the forming tool.

While blank 80 is undergoing the above described process, other blanks 50, 60, 70 are undergoing other processes. Blank 70 is being drawn, whereas blanks 50 and 60 are undergoing post-operations.

During forming, the last complete contact between the working surface of the upper die of the forming tool and the blank (and thus the end of the drawing operation) may be between 180° and 210° position. The last contact between the blank and blank holder in this example may be between for example 210°-270°.

The temperature of the blank 70 may be reduced during forming until a temperature between 300° C. and 400° C., specifically around 350-370° C. is reached. The press tool may be provided with a cooling system. The cooling system may be controlled by a controller, thus the temperature of the blank 70 may be reduced and maintained at a desired temperature.

Blank 60 already has been drawn, and has been transferred from the press tool 20 to the first post operation tool 30 for e.g. piercing or trimming. The transferring may be performed by an automatic transfer device (not shown) e.g. a plurality of industrial robots or a conveyor. As commented above, the blank 60 may leave the press tool 20 at a temperature above 300° C. and specifically between 350-370° C. Due to the transfer time, the blank 60 may have cooled down a little bit further. The blank 100 may be placed onto the lower die 31 and between the lower die 31 and the upper die 32.

The blank 60 has been transferred or positioned onto the lower die 31, the automatic transfer system may be operated to provide the blank 200 to the press tool 20 and to provide a blank 300 to the cooling tool 10. As a result, the cooling tool 10 may start the operation in order to cool down the blank 300 as commented above. At the same time, the press tool 20 may start the operation in order to draw and cool down the blank 300 as also commented above.

In the first post-operation tool, the upper die 32 may only contact the blank 60 placed between the press tool upper die 31 and the press tool lower die 31 when the final desired position (at or near 180° of the press cycle) has been reached.

While the press is in contact with the blank 60, a piercing operation may be performed using the cutting blades or some other cutting element. Once the piercing operation is finished, a trimming operation may be performed. In alternative examples, the trimming operation may be performed first and the trimming operation may be performed once the trimming operation is finished. Trimming and piercing may also occur substantially simultaneously.

While the blank 60 undergoes the post operation, the blank may be heated up by using the heating equipment commented above in order to maintain the blank above a minimum temperature and ensure deformability of the blank.

Figure 1F:
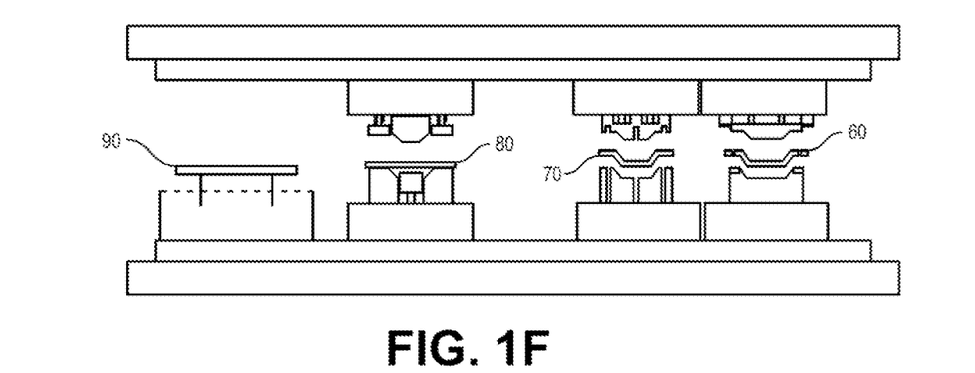

Once the final desired position (180° position of the press cycle) is reached, an upwards press progression may be provided. The last complete contact between the working surface of the upper die 32 and the blank 100 (and thus the end of the operation) may be between the 180° and 210° position. The last contact between blank and blank holder (if provided in the post operation tools) may occur between 210° and 270° of the press cycle.

Finally, in this particular example, a second post-operation tool is included in the press apparatus. It should be clear that in further example, no post-operation tool or more than two post-operation tools may be included in the press apparatus.

The second post-operation tool in this example, may be used for piercing and/or trimming. Additionally, a calibration operation may be performed, thus the manufacturing tolerances of the blank may be improved. For this purpose, the distance between the upper die 42 and the lower die 41 may be adjusted using an adjusting device. The adjusting device may be controlled based on a sensor system (not shown) configured to detect the thickness of the blank 100. Following the example, the blank may be pressed by the upper 42 and lower 41 dies, thus a constant thickness of the blank may be achieved. Similarly as for the first post-operation tool, die temperature (and thus blank temperature) may be controlled and particularly, a minimum temperature for the blank may be ensured.

Once the operation of the second post-operation tool is finished, the blank may be transferred and hardened at a room temperature.

In some examples, depending on the required shape of the end component, further drawing and other operations e.g. piercing and/or trimming may be provided. In further examples, the order of post-operations may be interchanged (e.g. first cutting, then calibrating or vice versa).

Figure 2A:
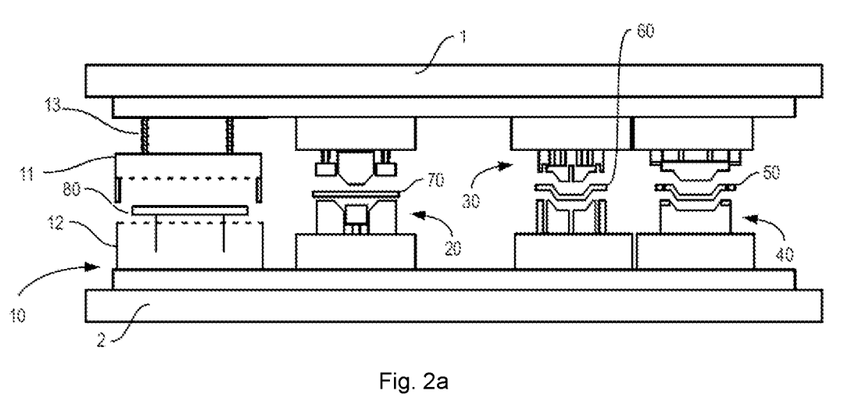
FIG. 2A schematically illustrates another example of a multistep press system.

FIG. 2a shows another example of a multistep press apparatus. In this example, the cooling tool 10 includes both an upper cooling tool 11 and a lower gas cooling tool 12.

In this particular example, the upper gas cooling tool 11 is connected to the mobile upper body 1 through one or more biasing elements. The biasing element pushes the upper gas cooling tool away from the mobile upper body 1 towards the fixed lower body 2. The biasing element in this example can be springs, e.g. mechanical springs or gas springs, but in other examples, other biasing elements might be used. Such alternative biasing elements might include e.g. a hydraulic mechanism to force the cooling tool towards the opposite cooling tool.

In other examples, the lower gas cooling tool 12 may be connected to the fixed lower body 1 through biasing elements. The working principle will be the same as described herein for the upper gas cooling tool. In some examples, biasing elements may be provided for both the upper gas cooling tool 11 and the lower gas cooling tool 12.

With the insertion of the upper and/or lower biasing elements, the time for cooling may be regulated and increased during a stroke cycle (up and down movement of the mobile upper body 1 with respect to the lower body 2).

Due to the biasing elements in the cooling tool, cooling may start before the contact of the press dies of the forming tool (and further tools arranged downstream).

Figure 2B:
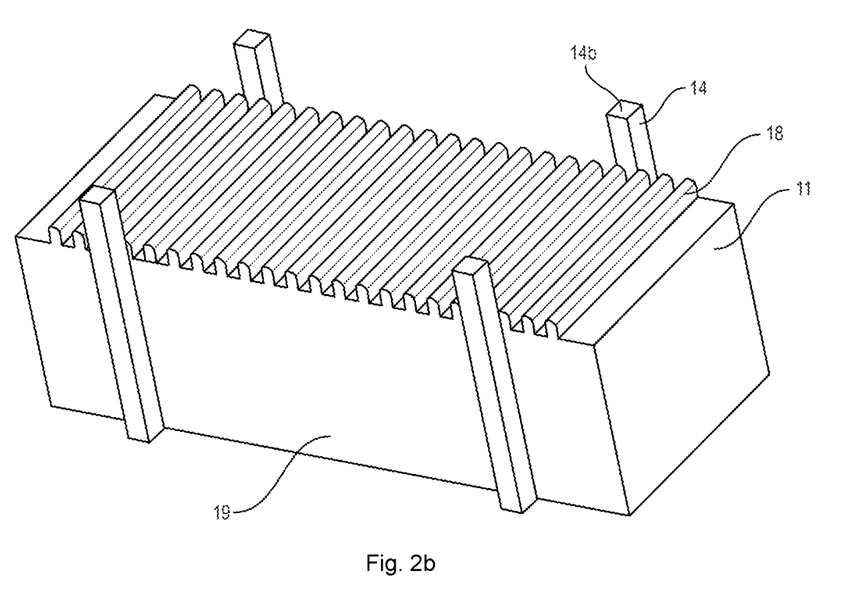

The upper gas cooling tool is provided with stoppers 14. These are also illustrated in FIG. 2b. The stoppers 14 may be rod shaped and may enter into contact with the lower gas cooling tool 12 (or with the fixed lower body) when the mobile upper body 1 moves downwards. The stoppers 14 can ensure that a distance is maintained between the upper and the lower gas cooling tool. This also means that a distance is maintained between the upper gas cooling tool 11 and blank 80.

The stoppers may be sized and shaped such that the distance from the upper gas cooling tool 11 to blank 80 is also maintained at distance dl (the distance between the lower air cooling tool 12 and the blank 80) for a part of the press cycle when the cooling takes place.

With reference to FIG. 2B, an example of the possible arrangement of a plurality of stoppers 14 may be seen. In this example, stoppers 14 are generally straight bars. Distal ends 14A of the stoppers may be flat and in this example may provide a contact surface for the lower gas cooling tool. As has been noted before, the role of the upper and lower gas cooling tools may be inverse. The bars 14 are attached at side surfaces of the upper gas cooling tool 11. Also indicated in FIG. 1B are a plurality of straight slots 18 through which pressurized cooling gas may exit and flow towards a blank.

The upper gas cooling tool 11 may be arranged at a predetermined distance with respect the upper body 2 using upper biasing elements 13.

FIGS. 3a-3f illustrate a similar sequence of steps as in FIGS. 1a-1f. However, contrary to the previous example, the cooling tool in this example has both an upper gas cooling tool 11 and a lower gas cooling tool 12.

Figure 3A:
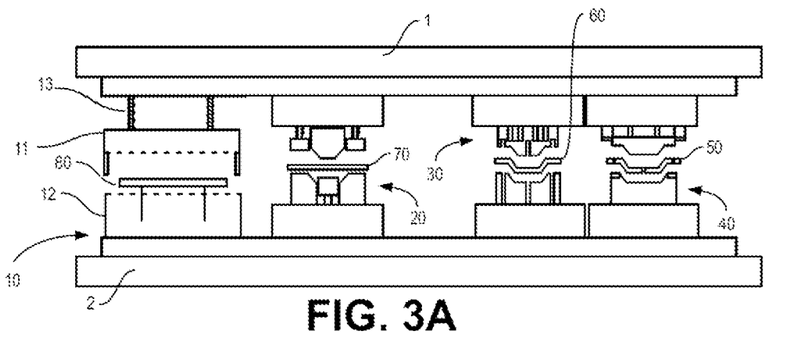
FIGS. 3a-3f schematically illustrate a sequence of situations occurring during the performance of a method for cooling and forming a blank according to an example.

FIG. 3*a* shows the multistep press apparatus of FIG. 2A before a press progression starts, e.g. at 0° of the press cycle.

Figure 3B:
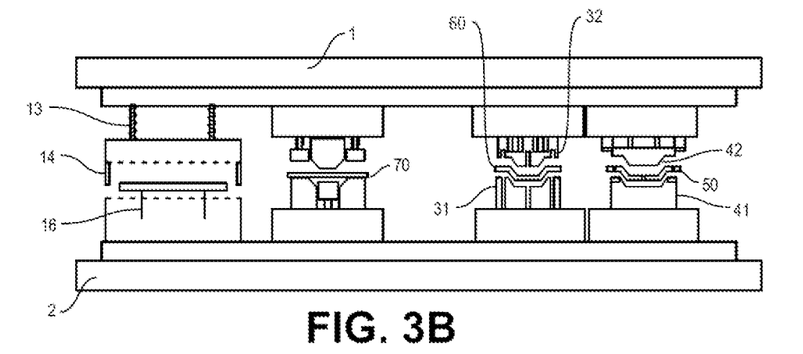

In FIG. 3*b*, the press apparatus has started a downwards press progression of the mobile upper body 1 with respect to the fixed lower body 2, thus the upper gas cooling tool 11 has moved towards the lower die 12 (and thus the blank 80 located on the lower tool 11).

The upper gas cooling tool 14 carries stoppers 14 that extend towards the lower gas cooling tool. In the situation of FIG. 3*b*, the stoppers 14 are about to enter into contact with the lower gas cooling tool 12.

Figure 3C:
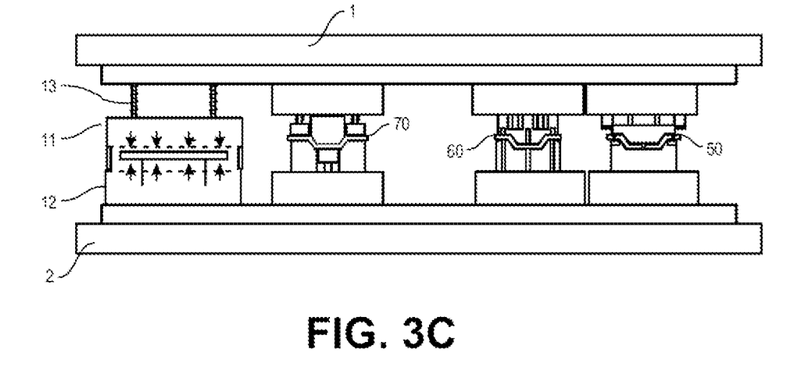

In FIG. 3*c*, e.g. in a range between 90° and 150° of the press cycle, the stoppers 14 enter into contact with the lower gas cooling tool. The blank 80 is then at a predetermined distance from the upper gas cooling tool. The blank is also at a predetermined distance from the lower gas cooling tool. The blank may be arranged at an equal distance from the upper and lower gas cooling tool. When the distances of the blank to the upper and lower gas cooling tool are well defined, a controlled cooling can take place.

As press progression continues, the distance between upper and lower cooling tools, and between the cooling tools and the blank may be maintained because the biasing elements are compressed.

A pressurized cooling gas flow (which may be air) may impinge on the blank. As mentioned before, the gas flow may be controlled based on measurements of a flow meter. The pressure of the gas may be e.g. around 2 bar. The required gas flow and gas temperature may vary e.g. as a function of the thickness of the blank. A thicker blank will take longer to cool down unless gas temperature is lowered and/or gas flow is increased. The use of both a lower and an upper gas cooling tool can ensure a relatively short cooling cycle even for thicker blanks.

Figure 3D:
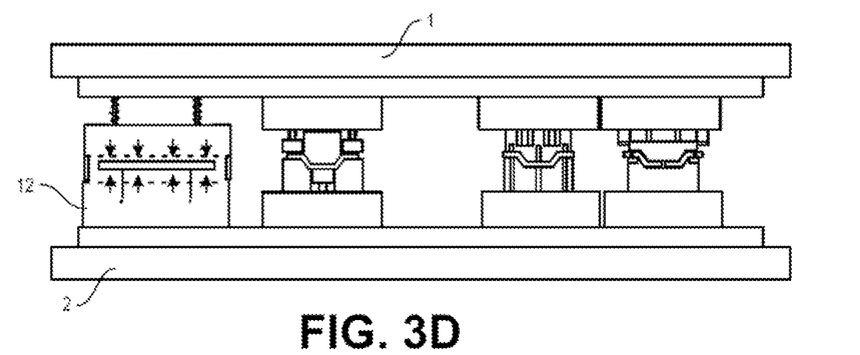

In FIG. 3*d*, after the final desired position (180° position) is reached, an upwards press progression of the upper body by the press mechanism may be provided. The end of the cooling cycle may be between 210° and 270° position of the upper body (and thus the upper die) with respect to the lower body. The upper biasing elements 13 which may be seen to still be partly compressed in the situation of FIG. 3D may start to return to their original position or configuration. By suitable arrangement of biasing elements, the cooling period may be longer than the pressing period and the cooling cycle may last e.g. between 0.33 and 1 second.

Figure 3E:
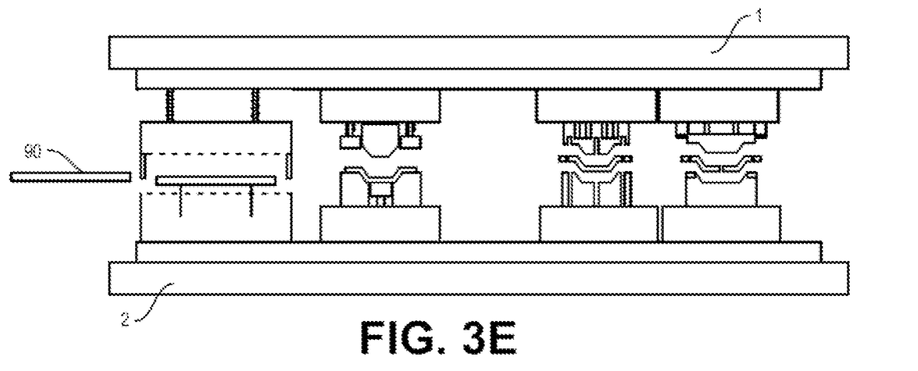
Figure 3F:
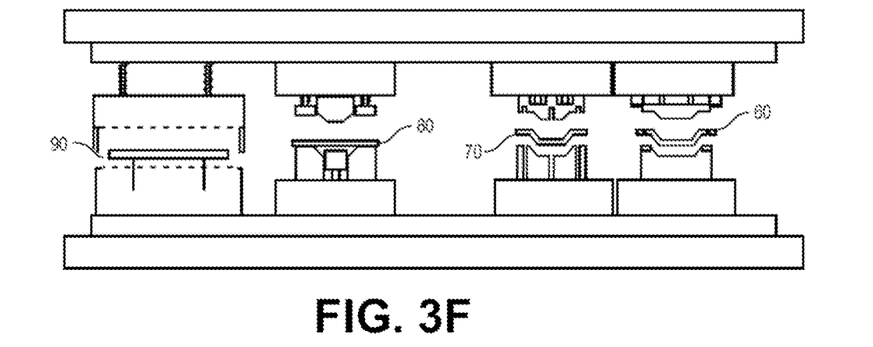

FIG. 3E and FIG. 3F are generally similar to what was described in FIGS. 2E and 2F.

In the example herein described, gas cooling started when the blank was arranged at a specific predetermined distance with respect to upper and lower air cooling tools. It should be clear that in other examples, gas cooling may start before such a moment, and may also be continuous.

Figure 4:
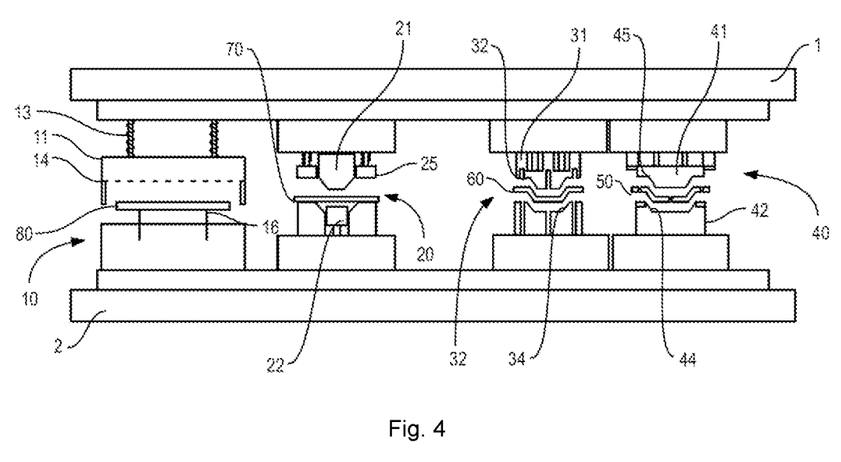
FIG. 4 schematically illustrates yet a further example of a multistep press system.

FIG. 4 schematically illustrates yet a further example of a multistep press apparatus. In this example, the cooling tool 10 does not have a lower cooling tool, and only has an upper gas cooling tool 11. The upper gas cooling tool 11 may be connected to the mobile upper body with 1 with upper biasing elements 13.

The upper gas cooling tool may comprise stoppers 14 as was shown before. As in the previous example, the combination of biasing elements 13 and stoppers allows the minimum distance between the cooling tool and the blank can be reached sooner and the minimum distance is then maintained. The cooling cycle can thus be longer than the forming cycle.

For reasons of completeness, various aspects of the present disclosure are set out in the following numbered clauses:

Clause 1. A press apparatus for manufacturing hot formed structural components, comprising: a fixed lower body, a mobile upper body and a mechanism configured to provide upwards and downwards press progression of the mobile upper body with respect to the fixed lower body, wherein the apparatus comprises:
a cooling tool configured to cool down a previously heated blank and
a press tool configured to draw the blank and which is arranged downstream from the cooling tool, and
a blank transfer mechanism to transfer the blank from the cooling tool to the press tool
wherein the cooling tool has an upper gas cooling tool connected to the mobile upper body and/or a lower gas cooling tool connected to the fixed lower body,
wherein the press tool comprises an upper pressing die connected to the upper body and a lower pressing die is connected to the lower body.

Clause 2. The press apparatus according to clause 1, wherein the press apparatus is configured such that a cooling time is longer than a drawing time in a press cycle.

Clause 3. The press apparatus according to clause 1 or 2, comprising a lower gas cooling tool connected to the fixed lower body.

Clause 4. The press apparatus according to clause 1 or 2, comprising an upper gas cooling tool connected to the mobile upper body with one or more upper biasing elements that bias the upper gas cooling tool away from the mobile upper body.

Clause 5. The press apparatus according to clause 1 or 2, wherein the cooling tool has an upper gas cooling tool connected to the mobile upper body and a lower gas cooling tool connected to the fixed lower body,
wherein the upper gas cooling tool is connected to the mobile upper body with one or more upper biasing elements that bias the upper gas cooling tool away from the mobile upper body and/or the lower gas cooling tool is connected to the fixed lower body with one or more lower biasing elements that bias the lower gas cooling tool away from the fixed lower body.

Clause 6. The press apparatus according to clause 4 or 5, wherein at a bottom of a press cycle the upper gas cooling tool is at a predetermined first distance with respect to the blank, and the lower gas cooling tool is at a predetermined second distance with respect to the blank.

Clause 7. The press apparatus according to clause 6, wherein the predetermined first distance is equal to the predetermined second distance.

Clause 8. The press apparatus according to any of clauses 4-7, wherein the cooling tool comprises stoppers that maintain a minimum distance between the upper gas cooling tool and the blank.

Clause 9. The press apparatus according to clause 8, wherein the stoppers are provided on the upper gas cooling tool and the stoppers are arranged to enter into contact with the lower gas cooling tool to create a force opposite to the biasing elements.

Clause 10. The press apparatus according to clause 9, wherein the stoppers are rods or bars.

Clause 11. The press apparatus according to any of clauses 8-10, wherein the apparatus is configured to start a cooling cycle when the minimum distance between the upper gas cooling tool and the blank is reached.

Clause 12. The press apparatus according to any of clauses 4-11, wherein the biasing elements comprise one or more springs.

Clause 13. The press system according to any of clauses 1-12, wherein the upper gas cooling tool and/or the lower gas cooling tool comprise a plurality of slots connected to a pressurized gas reservoir, and the system further comprising a control for controlling the gas passage from the reservoir through the slots.

Clause 14. The press system according to clause 13, wherein the slots are directed substantially perpendicularly to the blank.

Clause 15. The press system according to clause 14, wherein the gas is air at ambient temperature.

Clause 16. The press system according to any of clauses 13-15, further comprising a temperature control of the pressurized gas in the reservoir.

Clause 17. The press apparatus according to any of clauses 1-16, wherein the upper and/or lower pressing die of the press tool comprises channels conducting cooling liquid or cooling air.

Clause 18. The press apparatus according to clause 17, wherein a temperature at the upper and/or lower pressing die is controlled based on a temperature at a working surface of one of the dies.

Clause 19. The press apparatus according to clause 18, further comprising one or more thermocouples at the working surface of one of the pressing dies.

Clause 20. The press apparatus according to any of clauses 1-19, wherein the press apparatus is a mechanical press.

Clause 21. The press apparatus according to any of clauses 1-19, wherein the press apparatus is a servo mechanical press.

Clause 22. The press apparatus according to any of clauses 1-19, wherein the press apparatus is a hydraulic press.

Clause 23. The press apparatus according to any of clauses 1-22, further comprising a first post-operation tool configured to perform a first post-operation, wherein the first post-operation tool is arranged downstream of the press tool and comprises:
  upper and lower first post-operation tool dies, wherein
    the upper first post-operation tool die is connected to the upper body and the lower first post-operation tool die is connected to the lower body, and wherein
    the blank transfer mechanism is further configured to transfer the blank from the press tool to the first post-operation tool.

Clause 24. A press apparatus according to clause 23, wherein the first post-operation comprises trimming and/or cutting the blank, and wherein
  the upper and/or the lower first post-operation tool dies comprises one or more cutting blades.

Clause 25. A press apparatus according to clause 23 or 24, wherein the upper and/or the lower first post-operation tool die comprises one or more heaters or channels conducting a hot liquid.

Clause 26. A press apparatus according to clause 25, wherein the heaters or channels conducting a hot liquid are configured to maintain the temperature of the blank above 250° C. or 300° C. based on the temperature measured at the dies of the first post-operation tool.

Clause 27. A press apparatus according to any of clauses 23-26, wherein the upper and/or the lower first post-operation tool die comprises channels conducting cooling liquid, optionally cooling water.

Clause 28. The press apparatus according to any of clauses 25-27, wherein a temperature at the upper and/or lower first post-operation tool die is controlled based on a temperature at a working surface of one of the dies.

Clause 29. The press apparatus according to clause 28, further comprising one or more thermocouples at the working surface of one of the first post-operation tool dies.

Clause 30. The press apparatus according to any of clauses 23-29, and further comprising a second post-operation tool, the second post-operation tool being arranged downstream of the first post-operation tool and the blank transfer mechanism is further configured to transfer the blank from the first post-operation tool to the second post-operation tool and wherein
  the upper second post-operation tool die is connected to the upper body and the lower second post-operation tool die is connected to the lower body.

Clause 31. The press apparatus according to clause 30, wherein the second post-operation tool is configured for trimming and/or piercing.

Clause 32. The press apparatus according to clause 31, wherein the second post-operation tool comprises upper and lower second post operation tool dies, wherein
  the first and/or the second post-operation tool comprises one or more cutting blades.

Clause 33. The press apparatus according to any of clauses 30-32, wherein the second post-operation tool comprises an adjusting device configured to adjust a distance between the upper and lower second post-operation tool dies so as to deform the blank, and wherein the adjusting device is controlled based on a sensor system configured to detect the thickness of the blank.

Clause 34. The press apparatus according to any of clauses 30-33, wherein a temperature at the upper and/or lower first post-operation tool die is controlled based on a temperature at a working surface of one of the dies.

Clause 35. The press apparatus according to clause 34, further comprising one or more thermocouples at the working surface of one of the first post-operation tool dies.

Clause 36. A method for hot forming a blank comprising:
  Providing a press apparatus according to any of clauses 1-35;
  providing a blank to be hot formed made of an Ultra High Strength Steel (UHSS) having a Zinc coating;
  heating the blank;
  placing the blank in the cooling tool;
  cooling down the blank while providing a downwards press progression of the mobile upper body with respect the fixed lower;
  performing an upwards press progression of the mobile upper body with respect to the fixed lower body;
  positioning the blank in the press tool; and
  drawing the blank by performing a downward and upwards press progression of the mobile upper body with respect to the fixed lower body.

Clause 37. The method according to clause 36, wherein the blank is heated to above an austenization temperature of the UHSS.

Clause 38. The method according to clause 37, wherein the blank is heated to a temperature between 860° C. and 910° C.

Clause 39. The method according to any of clauses 36-38, wherein the UHSS comprises approximately 0.22% C, 1.2% Si, 2.2% Mn.

Clause 40. The method according to clause 39, wherein the UHSS further comprises Mn, Al, Ti, B, P, S, N.

Clause 41. The method according to any of clauses 36-40, wherein the blank is cooled down in the cooling tool to a temperature between 500° and 600° C.

Clause 42. The method according to any of clauses 36-41, further comprising cooling down the blank during drawing.

Clause 43. The method according to clause 42, wherein the blank is cooled down during drawing to a temperature between 400° C. and 300° C.

Clause 44. The method according to any of clauses 36-43, wherein the press apparatus includes a first post-operation tool comprising upper and lower first post-operation tool dies having cutting blades, wherein
the upper first post-operation tool die is connected to the upper body and the lower first post-operation tool die is connected to the lower body, and
the method further comprising piercing and/or trimming the blank by
transferring the blank from the press tool to the first post-operation tool; and
providing a downwards and upwards press progression of the mobile upper body with respect to the fixed lower body.

Clause 45. The method according to clause 44, wherein the temperature of the blank located at the first post-operation tool is maintained above 200° C., specifically above 300° C.

Clause 46. The method according to clause 44 or 45, wherein the press apparatus includes a second post-operation tool comprising upper and lower second post-operation tool dies, wherein
the upper second post-operation tool die is connected to the upper body and the lower second post-operation tool die is connected to the lower body, and
the method further comprising:
transferring the blank from the first post-operation tool to the second post-operation tool; and
providing a downwards and upwards press progression of the mobile upper body with respect to the fixed lower body.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A press apparatus for manufacturing hot formed structural components, comprising: a fixed lower body, a mobile upper body and a mechanism configured to provide upwards and downwards press progression of the mobile upper body with respect to the fixed lower body, wherein the press apparatus further comprises:
a cooling tool configured to cool down a previously heated blank;
a press tool configured to draw the blank and which is arranged downstream from the cooling tool; and
a blank transfer mechanism to transfer the blank from the cooling tool to the press tool,
wherein the cooling tool comprises a gas cooling tool having a plurality of openings facing the previously heated blank and wherein the gas cooling tool is configured to provide a pressurized cooling gas flow from an inside of the gas cooling tool through the plurality of the openings to an outside of the gas cooling tool, and to direct the pressurized cooling gas flow towards the blank,
wherein the gas cooling tool is an upper gas cooling tool connected to the mobile upper body and/or a lower gas cooling tool connected to the fixed lower body, and
wherein the press tool comprises an upper pressing die connected to the mobile upper body and a lower pressing die connected to the fixed lower body.

2. The press apparatus according to claim 1, wherein the press apparatus is configured such that a cooling time is longer than a drawing time in a press cycle.

3. The press apparatus according to claim 1, wherein the gas cooling tool is the lower gas cooling tool connected to the fixed lower body.

4. The press apparatus according to claim 1, wherein the gas cooling tool is the upper gas cooling tool connected to the mobile upper body with one or more upper biasing elements that bias the upper gas cooling tool away from the mobile upper body.

5. The press apparatus according to claim 1, wherein the cooling tool comprises two gas cooling tools, one of the gas cooling tools being the upper gas cooling tool connected to the mobile upper body and the other of the two gas cooling tools being the lower gas cooling tool connected to the fixed lower body,
wherein the upper gas cooling tool is connected to the mobile upper body with one or more upper biasing elements that bias the upper gas cooling tool away from the mobile upper body and/or the lower gas cooling tool is connected to the fixed lower body with one or more lower biasing elements that bias the lower gas cooling tool away from the fixed lower body.

6. The press apparatus according to claim 5, wherein at a bottom of a press cycle the upper gas cooling tool is at a predetermined first distance with respect to the blank, and the lower gas cooling tool is at a predetermined second distance with respect to the blank.

7. The press apparatus according to claim 6, wherein the cooling tool comprises stoppers that maintain a minimum distance between the upper gas cooling tool and the blank.

8. The press apparatus according to claim 7, wherein the stoppers are provided on the upper gas cooling tool and the stoppers are arranged to enter into contact with the lower gas cooling tool to create a force opposing the one or more upper biasing elements.

9. The press apparatus according to claim 4, wherein the one or more upper biasing elements comprise one or more springs.

10. The press apparatus according to claim 1, wherein the upper gas cooling tool and/or the lower gas cooling tool comprise(s) a plurality of slots connected to a pressurized gas reservoir, and the press apparatus further comprises a control for controlling the gas passage from the reservoir through the slots.

11. The press apparatus according to claim 10, wherein the slots are directed substantially perpendicularly to the blank.

12. The press apparatus according to claim 1, wherein the upper and/or lower pressing die of the press tool comprise(s) channels conducting cooling liquid or cooling air.

13. The press apparatus according to claim 1, wherein the press apparatus is a mechanical press or a servo mechanical press.

14. The press apparatus according to claim 1, further comprising a first post-operation tool configured to perform a first post-operation, wherein the first post-operation tool is arranged downstream of the press tool and comprises:

upper and lower first post-operation tool dies, wherein
the upper first post-operation tool die is connected to the mobile upper body and the lower first post-operation tool die is connected to the fixed lower body, and wherein
the blank transfer mechanism is further configured to transfer the blank from the press tool to the first post-operation tool.

15. A method for hot forming a blank comprising:
providing a press apparatus for manufacturing hot formed structural components, the press apparatus comprising:
a fixed lower body, a mobile upper body and a mechanism configured to provide upwards and downwards press progression of the mobile upper body with respect to the fixed lower body, and the apparatus further comprising:
a cooling tool configured to cool down a previously heated blank;
a press tool configured to draw the blank and which is arranged downstream from the cooling tool; and
a blank transfer mechanism to transfer the blank from the cooling tool to the press tool,
wherein the cooling tool comprises a gas cooling tool having a plurality of openings facing the previously heated blank and wherein the gas cooling tool is configured to provide a pressurized cooling gas flow from an inside of the gas cooling tool through the plurality of the openings to an outside of the gas cooling tool, and to direct the pressurized cooling gas flow towards the blank,
wherein the gas cooling tool is an upper gas cooling tool connected to the mobile upper body and/or a lower gas cooling tool connected to the fixed lower body, and
wherein the press tool comprises an upper pressing die connected to the mobile upper body and a lower pressing die connected to the fixed lower body;
and the method further comprising:
providing a blank to be hot formed made of an Ultra High Strength Steel (UHSS) having a Zinc coating;
heating the blank;
placing the blank in the cooling tool;
cooling the blank while providing a downwards press progression of the mobile upper body with respect the fixed lower body;
performing an upwards press progression of the mobile upper body with respect to the fixed lower body;
positioning the blank in the press tool; and
drawing the blank by performing a downwards and upwards press progression of the mobile upper body with respect to the fixed lower body.

16. A method for hot forming a blank, comprising:
providing a blank to be hot formed made of an Ultra High Strength Steel (UHSS);
heating the blank;
placing the blank in a cooling tool, wherein the cooling tool has a gas cooling tool having a plurality of openings facing the previously heated blank and wherein the gas cooling tool is configured to provide a pressurized cooling gas flow from an inside of the gas cooling tool through the plurality of the openings to an outside of the gas cooling tool, and to direct the pressurized cooling gas flow towards the blank,
wherein the gas cooling tool is an upper gas cooling tool connected to a mobile upper body and/or a lower gas cooling tool connected to a fixed lower body;
cooling the blank while providing a downwards press progression of the mobile upper body with respect the fixed lower body;
performing an upwards press progression of the mobile upper body with respect to the fixed lower body;
positioning the blank in a press tool, wherein the press tool comprises an upper pressing die connected to the mobile upper body and a lower pressing die connected to the fixed lower body; and
drawing the blank by performing a downwards and upwards press progression of the mobile upper body with respect to the fixed lower body.

17. The method according to claim 16, wherein the blank is made of a boron steel and has a Zinc coating or an Aluminum-Silicon coating.

18. The method according to claim 16, wherein heating the blank comprises heating the blank to a temperature between 860° C. and 910° C.

19. The method according to claim 16, wherein the cooling the blank comprises cooling the blank to a temperature between 400 and 600° C.

20. The method according to claim 16, wherein the cooling the blank comprises cooling the blank to a temperature between 600 and 800° C.

* * * * *